Aug. 22, 1933.  W. E. BEGLEY ET AL  1,924,018
MOLD TREATING APPARATUS
Filed April 13, 1929  3 Sheets-Sheet 1

INVENTOR.
WILLIAM E. BEGLEY.
HENRY H. McGREGOR.
BY
Ely & Barrow
ATTORNEYS.

Aug. 22, 1933.  W. E. BEGLEY ET AL  1,924,018
MOLD TREATING APPARATUS
Filed April 13, 1929  3 Sheets-Sheet 3

INVENTOR.
WILLIAM E. BEGLEY.
HENRY H. McGREGOR.
By Ely & Barrow
ATTORNEYS.

Patented Aug. 22, 1933

1,924,018

UNITED STATES PATENT OFFICE 1,924,018

MOLD TREATING APPARATUS

William E. Begley and Henry H. McGregor, Akron, Ohio, assignors to The Firestone Tire & Rubber Company, Akron, Ohio, a Corporation of Ohio Application April 13, 1929. Serial No. 354,853

2 Claims. (Cl. 18—31)

This invention relates to apparatus for treating molds such as vulcanizing molds while traveling on the mold conveying systems usually employed in connection with the vulcanizers in factories making tires.

The general purpose of the invention is to provide in combination with a tire or other mold conveying system, an apparatus adapted to apply treating, cleaning or separating materials to the surfaces of the mold cavities between the point in the system at which the molds are opened to remove the cured tires or other articles and the point in the system where the raw tires or other articles are inserted in the molds.

Heretofore, in the treating of molds with various solutions, dopes or powders for cleaning, preserving or treating the mold surfaces, for lubrication or to aid in separating the vulcanized products therefrom, it has been customary to provide operatives along the conveyor between the above-mentioned points to spray or otherwise apply the mold treating materials to the mold cavities. The present invention avoids this labor and expense and automatically performs these duties.

The foregoing and other purposes of the invention are attained in the apparatus illustrated in the accompanying drawings and described below. It is to be understood that the invention is not limited to the specific form thereof shown and described.

Of the accompanying drawings.

Figure 1:
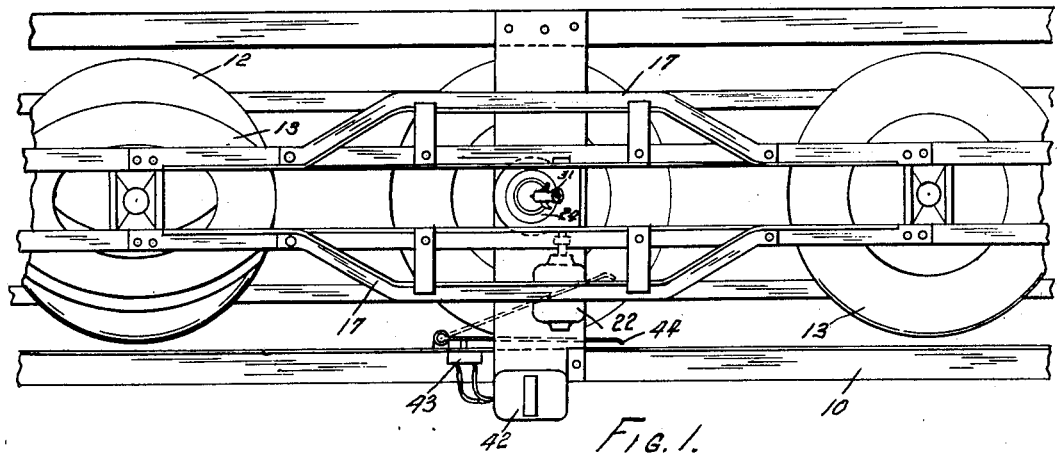
Figure 1 is a plan of a portion of a tire mold conveyor system at a point in which the improvement is installed.
Figure 2:
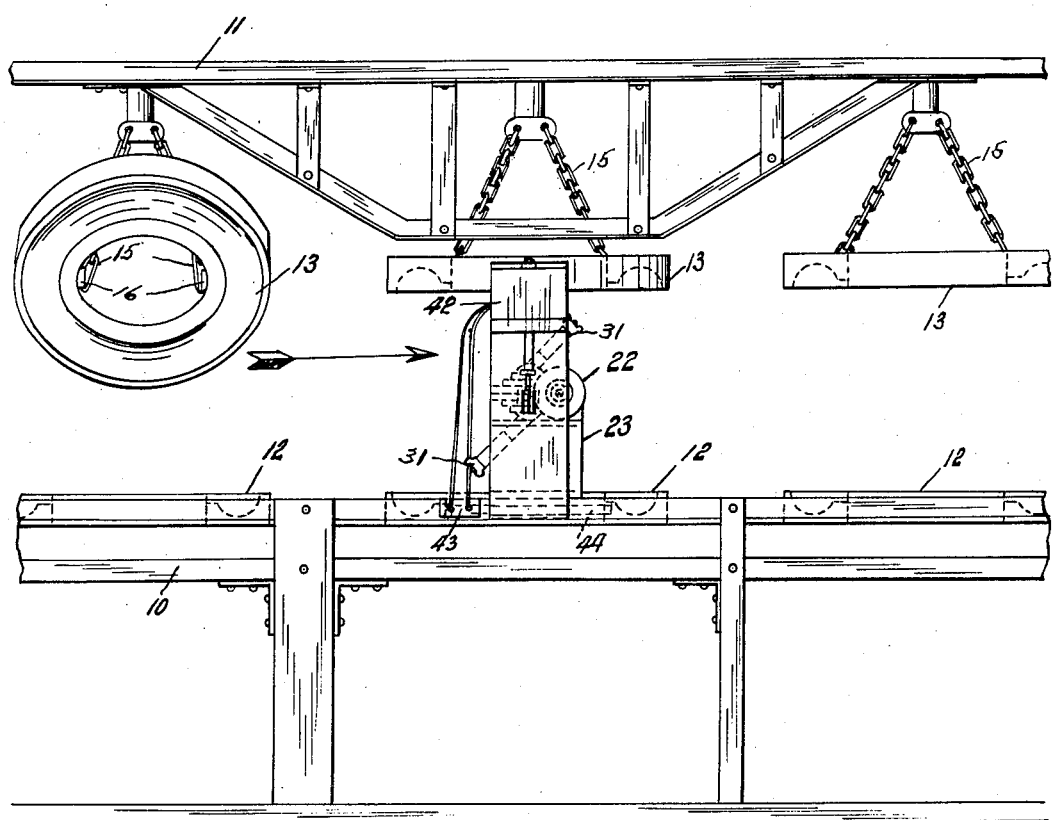
Figure 2 is an elevation thereof.

Referring to the drawings, the numeral 10 designates a tire mold conveyor and the numeral 11 an overhead conveyor operating over a portion of conveyor 10 to carry the upper mold sections during the removal of the vulcanized tires from the molds, the treating of the molds and the insertion of the raw tires therein. The lower mold sections are shown at 12 and the upper mold sections at 13, the former being pushed along by lugs 12a of chain 12b of the lower conveyor and the latter being carried by chains 15 suspended from the upper conveyor 11 and engaged over lugs 16 on the upper mold sections 13.

The upper mold sections normally assume an inclination toward the operatives at one side of the conveyor as shown for purposes of inspection and provision preferably is made to turn these mold sections down to a horizontal position for treatment by the improved apparatus. For this purpose fixed cam rails 17, 17 may be provided on the upper conveyor construction 11 so as to be engaged by the advancing mold sections 13.

The applicator is indicated generally at 18 and includes a rotary member 19 which may have a worm gear 20 integral therewith and meshed with a worm 21 driven by a motor 22, this applicator unit being mounted on a support 23 spacing conveyor 10 with the applicator disposed centrally of conveyors 10 and 11.

A housing 24 in which member 19 is journaled is provided with openings 25, 25 in the top and bottom thereof in which ball members 26, 26 are mounted by means of pins 27, 27 engaged in opposite slots 28, 28 in the surface of the balls, said pin and slot mounting of the ball members permitting universal action thereof. Stems 29, 29 extending inwardly from the balls are journaled in angularly directed bores 30, 30 and spray nozzles 31, 31 are secured to the ball members and directed outwardly therefrom in line with the stems 29 whereby rotation of member 19 effects gyratory movement of the spray nozzles 31. This causes the materials sprayed from the nozzles to be applied all about the annular mold cavities of the tire molds.

The nozzles 31 are of a known type to which the treating materials are supplied under pressure by hose 32, 32 connected to the nozzles at 33, 33. The usual triggers controlling the spray nozzles are shown at 34, 34 and these are connected by flexible elements 35, 35 extended through arcuate slots 36, 36 into the ball members over pulleys 37, 37 journaled therein and out of arcuate slots 38, 38 in said ball members over pulley 39, 39 mounted on casing 24 and over a pulley 40 mounted at one side of the conveyor (Figure 3) to a crosshead 41 to which the flexible elements are connected. The crosshead 41 is arranged to be operated by a solenoid device 42 controlled by a switch 43 arranged with a trip 44 adapted to be engaged by the passing molds to actuate the spray nozzle triggers during a comparatively short interval when said molds are aligned with the spray device.

Figure 3:
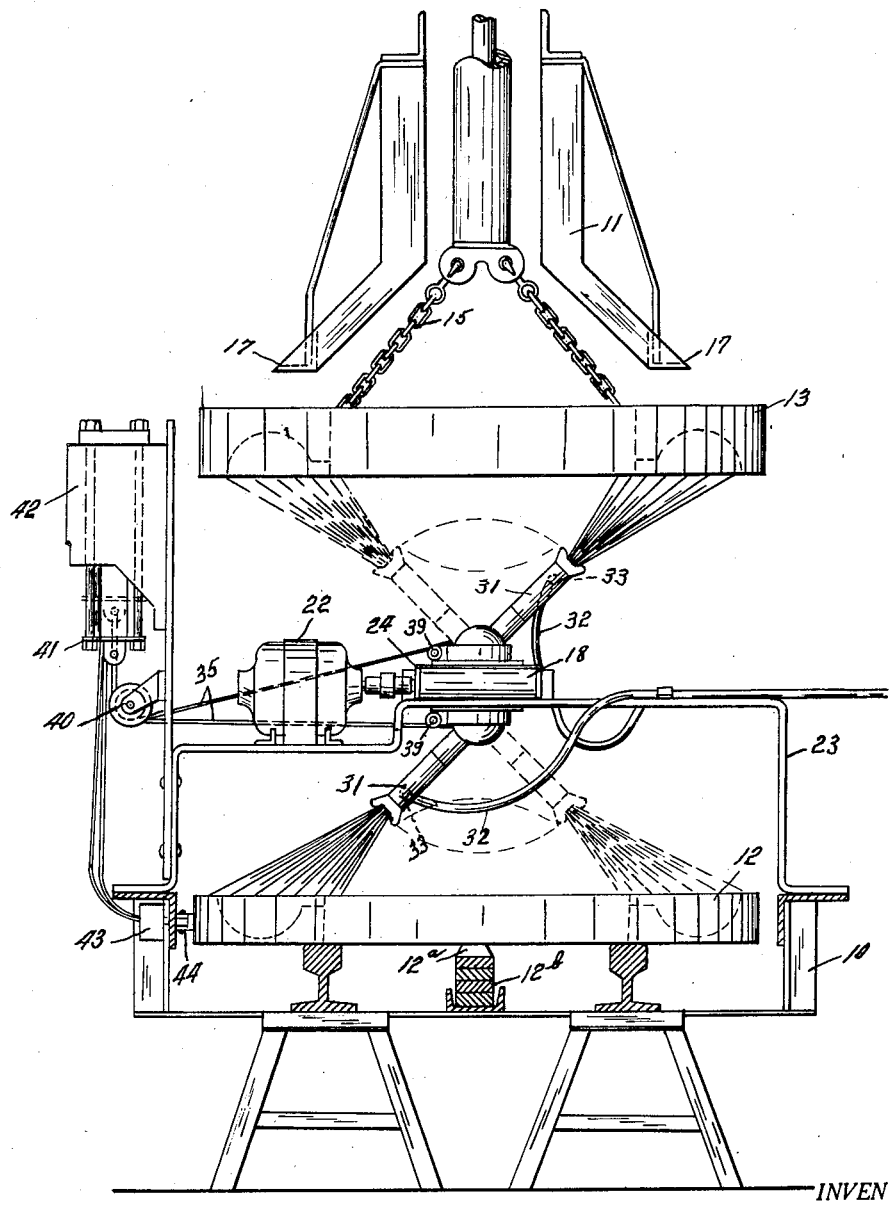
Figure 3 is an elevation of the applicator installation transversely of the conveyor.
Figure 5:
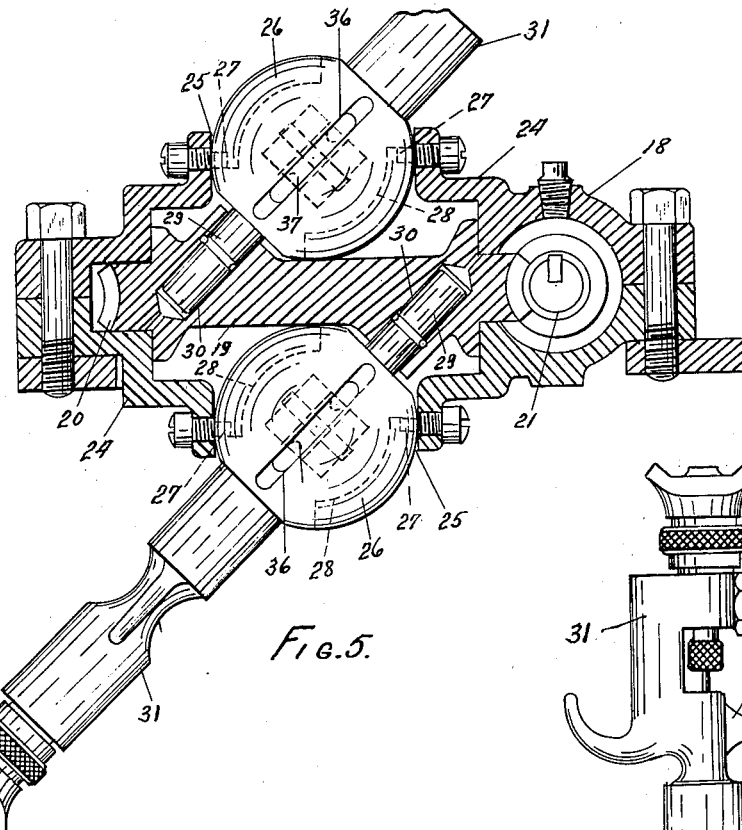
Figure 5 is a section on line 5—5 of Figure 4.
Figure 6:
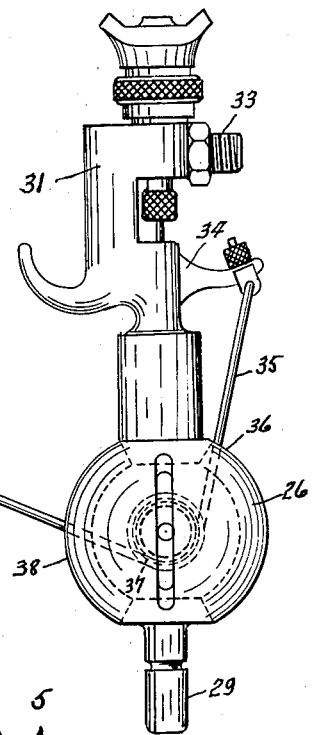
Figure 6 is an elevation of the spraying implement.
Figure 4:
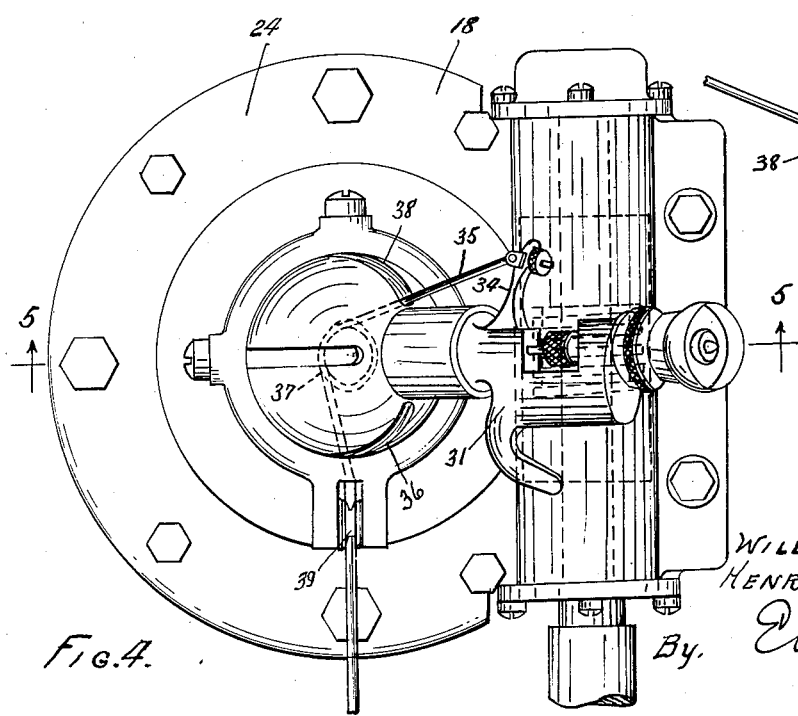
Figure 4 is an enlarged plan of the mold treating material applicator.

In operation, the spray devices are continuously rotated comparatively rapidly, the spray nozzles normally being closed. When a mold which is traveling comparatively slowly passes into a position in alignment with the device, the triggers of the spray nozzles are pulled by the mechanism described above, whereby as the molds pass through the sprayer the treating solution is sprayed about the annular cavities thereof as best shown in Figure 3. As the molds pass out of engagement with the switch tripping member 44 the nozzles are again closed to cut off the spray as will be understood.

The invention has provided a simple effective device for spraying molds, modifications of which obviously may be adopted without departing from the spirit of the invention or the scope of the appended claims.

What is claimed is:

1. The combination with a tire mold conveyor system including lower and upper conveyors carrying lower and upper annular tire mold sections respectively between a point where the completed tires are removed from the molds and a point where the tires to be vulcanized are mounted therein, of a spraying device including spray nozzles mounted in association with said conveyors and capable of a gyratory movement to direct sprays of treating materials about the annular mold cavities of said upper and lower mold sections, means for supplying treating materials under pressure to the nozzles, means for continuously imparting gyratory motion to said nozzles, said nozzles normally being closed, and means operable by the mold sections to open said nozzles as the mold sections pass into cooperating relation to said nozzles to spray the cavities of said molds with such mold treating materials.

2. The combination with a conveyor for conveying annular molds, of a mold spraying device comprising a gyratory nozzle adapted to direct a spray of treating material about an annular path approximating the area of said annular mold, said nozzle being normally closed, and means operable by the molds to open said nozzle as the molds pass into cooperating relation to said nozzle to spray the annular cavity of said molds with such mold treating material.

WILLIAM E. BEGLEY.
HENRY H. McGREGOR.